United States Patent [19]

Föhl

[11] Patent Number: 5,398,963
[45] Date of Patent: Mar. 21, 1995

[54] DRIVER-SIDE RESTRAINING GAS BAG SYSTEM FOR VEHICLES

[75] Inventor: Artur Föhl, Schorndorf, Germany

[73] Assignee: TRW Repa GmbH, Alfdorf, Germany

[21] Appl. No.: 206,592

[22] Filed: Mar. 3, 1994

[30] Foreign Application Priority Data

Mar. 12, 1993 [DE] Germany ............... 43 07 969.5

[51] Int. Cl.⁶ ............................................. B60R 21/16
[52] U.S. Cl. .............................. 280/731; 280/738; 280/736
[58] Field of Search ............... 280/731, 738, 728 R, 280/728 A, 750, 742, 736, 737, 739

[56] References Cited

U.S. PATENT DOCUMENTS

| | | | |
|---|---|---|---|
| 3,580,603 | 5/1971 | Chute | 280/738 |
| 3,680,884 | 8/1972 | Stephenson | 280/738 X |
| 3,787,075 | 1/1974 | Francis | 280/738 |
| 3,801,123 | 4/1974 | Jira | 280/731 |
| 3,843,152 | 10/1974 | Nonaka | 280/731 |
| 3,863,948 | 2/1975 | Vancil | 280/731 |
| 3,929,350 | 12/1975 | Pech | 280/738 X |
| 4,126,325 | 11/1978 | Weman | 280/738 |

FOREIGN PATENT DOCUMENTS

| | | | |
|---|---|---|---|
| 582335 | 7/1993 | European Pat. Off. | |
| 2238614 | 2/1975 | France | |
| 1324401 | 7/1973 | United Kingdom | 280/738 |
| 2192841 | 1/1988 | United Kingdom | |

Primary Examiner—Margaret A. Focarino
Assistant Examiner—Christopher P. Ellis
Attorney, Agent, or Firm—Tarolli, Sundheim & Covell

[57] ABSTRACT

In a driver restraining gas bag system for vehicles a compressed gas container is arranged clear of the steering wheel and connected by way of a gas duct with an inflation opening of the bag for filling the gas bag arranged on the steering wheel hub. At its entry into the steering wheel the gas duct means is sealed off by an annular sealing gap between a first gap defining surface formed on the steering wheel hub and an oppositely arranged second gap defining surface on a wall, which is stationary in relation to the vehicle's bodywork, of the gas duct means without contact between these gap defining surfaces.

5 Claims, 4 Drawing Sheets

DRIVER-SIDE RESTRAINING GAS BAG SYSTEM FOR VEHICLES

BACKGROUND OF THE INVENTION

The present invention relates to a driver-side restraining gas bag system for vehicles, comprising a gas source arranged clear of the steering wheel for filling the gas bag arranged on the steering wheel hub and a gas duct means arranged between the gas source and the inlet of the gas bag.

In a driver restraining gas bag system it is customary for a pyrotechnic gas generator to be integrated in the hub of the steering wheel. The gas generator is fired by an electrical pulse, which is furnished by a deceleration sensor.

In order to economize in the space required to accommodate the gas generator in the hub of the steering wheel and to do without rotary couplings for the source of the electrical pulse to the gas generator which is fixed in the steering wheel hub, there has already been a proposal, see the German patent publication 4,011,429 A1, to arrange the gas source clear of the steering wheel. The gas source comprises a plurality of compressed gas containers, which are fixedly mounted in the vehicle. From each compressed gas container there extends a duct to a rotary coupling, which consists of a stationary distribution disk and a distribution disk which runs thereon and is able to turn with the steering wheel hub. Such a rotary coupling is complex to produce and owing to the friction between the distribution disks may impair free rotation of the steering wheel.

SUMMARY OF THE INVENTION

The invention seeks to provide a driver-side restraining gas bag system for vehicles, in the case of which the gas duct means between the steering wheel hub and the gas source arranged clear of the steering wheel is free of causes of friction likely to impair free rotation of the steering wheel. In accordance with the invention at its entry into the steering wheel the gas duct means is sealed off by an annular sealing gap between a first gap defining surface formed on the steering wheel hub and an oppositely arranged second gap defining surface on a wall, which is stationary in relation to the vehicle's bodywork, of the gas duct means without contact between these gap defining surfaces. Not having rotary coupling pans in contact with one another means that the steering wheel is not stiffer to turn than a steering wheel without any gas bag. The sealing gap is only formed by the configuration and arrangement of certain portions on the steering wheel and on the steering column, for which only a limited amount of material and only simple features are necessary. The invention is based on the realization that the flow of gas from the gas source to a point inside the gas bag is not able to escape out of the seal gap forming part of the gas path and in fact at such seal gap there is even a jet pump effect at least aiding in filling the gas bag by which air is aspirated from the surroundings into the gas flow. Furthermore the invention is also based on the realization that when the vehicle occupant is thrown into the inflated gas bag the seal gap exerts the advantageous effect of controlledly letting off some of the gas from the inflated bag. The venting openings required in the case of a conventional design in the wall of the gas bag are, at least in pan, no longer required. This is an advantage to the extent that injury to the occupant by fragments escaping from the gas bag or by hot gases is prevented.

BRIEF DESCRIPTION OF THE DRAWINGS

Further advantageous developments and convenient forms of the invention will be understood from the following detailed descriptive disclosure in conjunction with the accompanying drawings and from the dependent claims.

DESCRIPTION OF THE PREFERRED EMBODIMENTS

Figure 1:
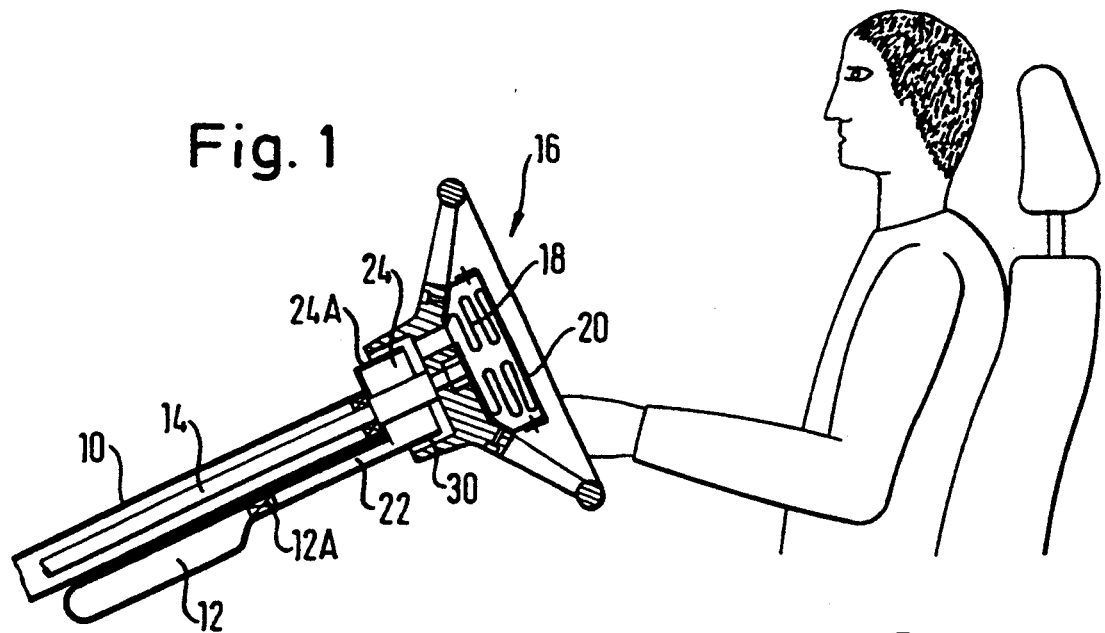
FIG. 1 is a diagrammatic lateral elevation of a driver's gas bag restraining system prior to activation thereof.
Figure 4:
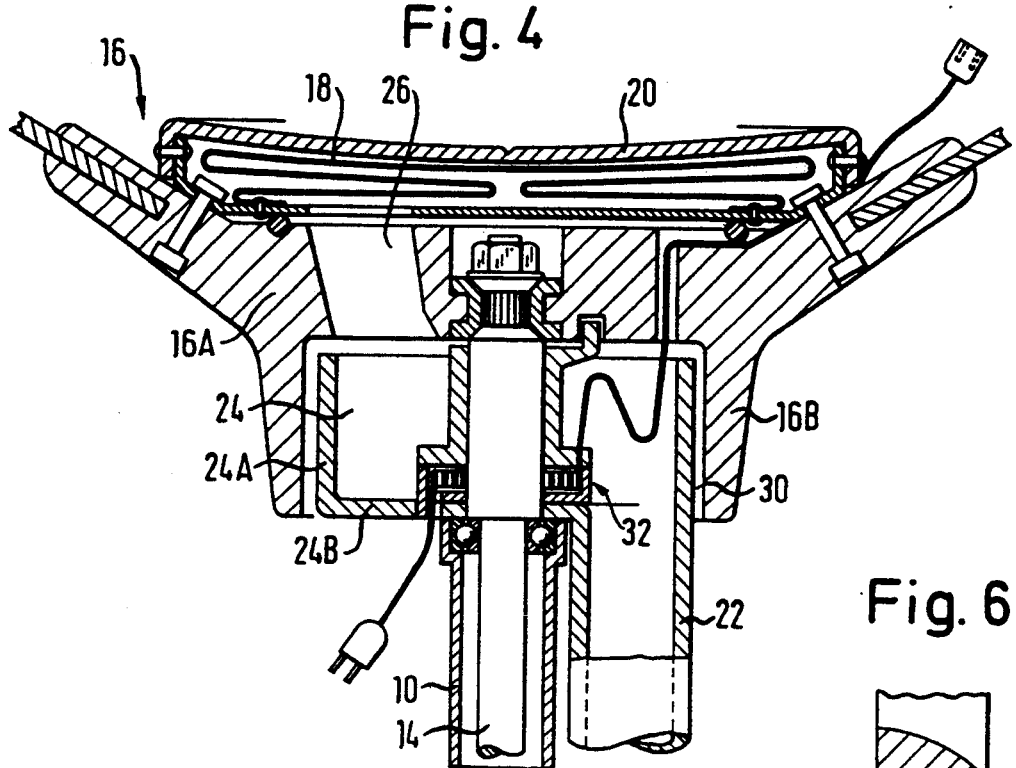
FIG. 4 is a sectional view through a steering wheel taken on the line IV—IV of FIG. 5.

An elongated compressed gas container 12 of generally cylindrical configuration is attached to the steering column 10 of a vehicle and is arranged in parallelism to the axis of the steering column. At its end adjacent to the driver the steering shaft 14, which is surrounded by the tubular steering column 10, bears a steering wheel 16, whose hub has a central passage for the end, which is provided with a thread, of the steering shaft 14 and by means of a nut is secured thereto (FIG. 4). A gas bag 18 (FIG. 1) which in the inactive condition is folded up, is arranged on the hub of the steering wheel 16 and is covered by a rip-off cover 20 at its end adjacent to the driver. Between the compressed gas container 12 and the space inside the gas bag 18 there is a gas duct, which will be described in the following.

The compressed gas container 12 is provided with a closure 12A, which may be broken open, for instance by means of a pyrotechnic charge, for activation of the restraining system.

Figure 2:
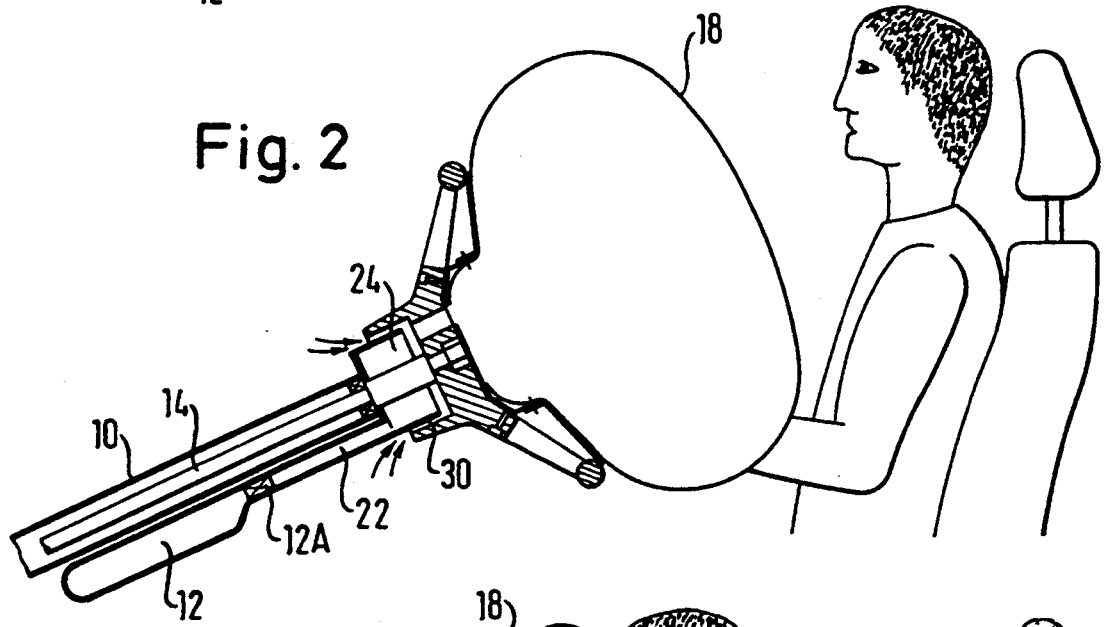
FIG. 2 shows the gas bag restraining system in the activated condition directly prior to the relative motion of the vehicle occupant in a forward direction.
Figure 3:
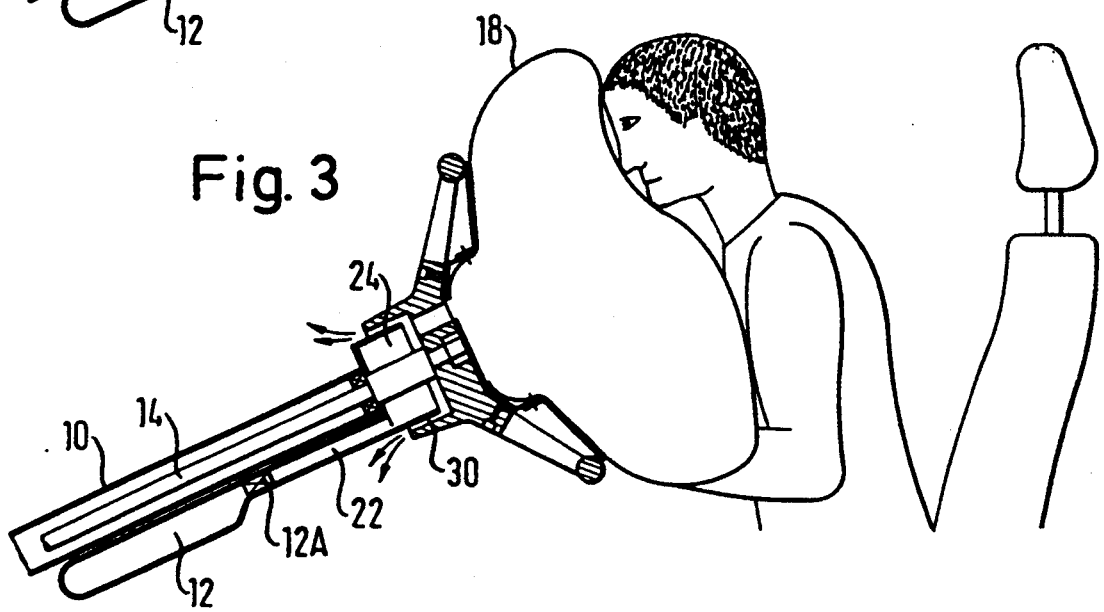
FIG. 3 shows the gas bag restraining system at the moment of first contact of the vehicle occupant with the inflated gas bag.

For the activation of the restraining system (FIG. 2) the gas stored in the compressed gas under a high pressure of, for example, 200 bar will flow into the gas bag 18, which is now inflated. After this the vehicle occupant will start to move forward in relation to the vehicle so that his or her head and chest will eventually plunge into the inflated gas bag (FIG. 3).

A pipe 22 is connected with the compressed gas container 12 and extends parallel to the steering column 10 and along its outer surface to open into an annular distribution chamber 24 surrounding the steering column 14. This distribution chamber 24 is delimited by a generally pot-like wall, whose peripheral part 24A is cylindrical and whose floor 24B is flat; this pot-like wall is connected integrally with the pipe 22 and is open towards the side of the steering wheel.

Figure 6:
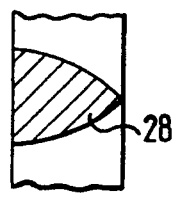
FIG. 6 is a section taken on the line VI—VI of FIG. 5.
Figure 5:
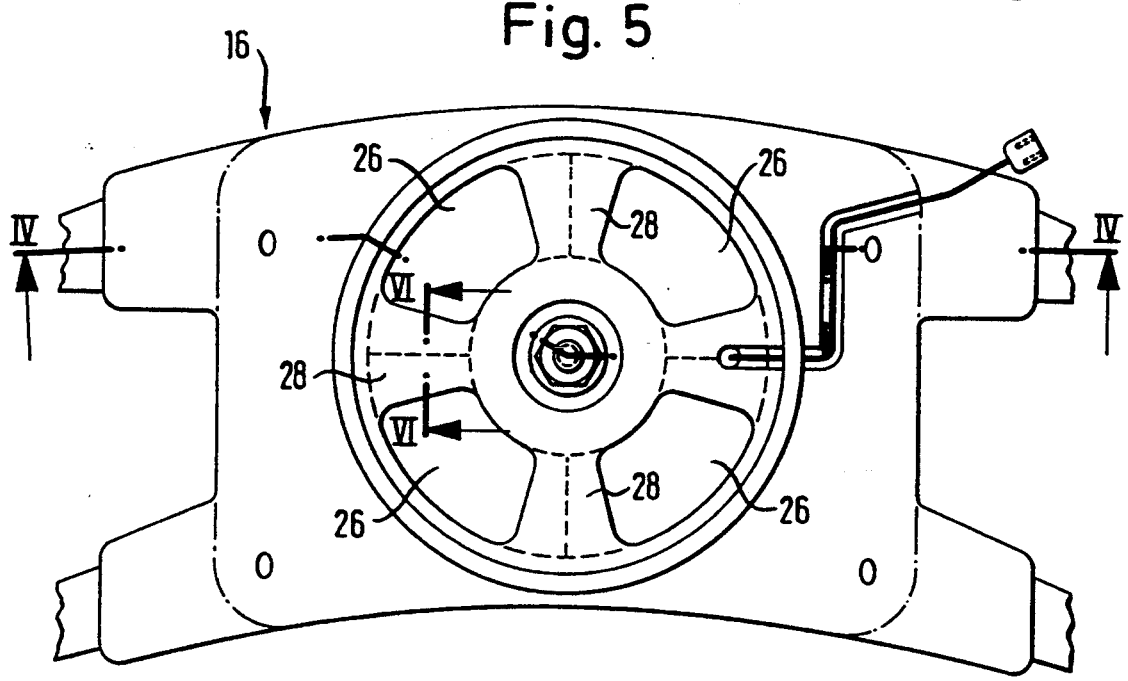
FIG. 5 is a plan view of a steering wheel omitting the gas bag.

Opposite to the hub 16A of the steering wheel 16 has four passage openings 26 arranged on a circle. The passage openings 26 are delimited by ribs 28 arranged like spokes whose cross section has a streamlined form, as shown in FIG. 6. On the hub 16A of the steering wheel a skirt 16B is molded surrounding the peripheral part 24A of the distribution chamber 24. Between the cylindrical inner surface of the skirt 16B and the outer surface of the peripheral part 24A an annular seal gap 30 is formed. The axial length of the seal gap 30 is approximately equal to the height of the distribution chamber 24. As shown in FIG. 4, the openings 26 in the steering wheel hub 16A are directly opposite to the open side of the distribution chamber 24. Furthermore the openings 26 are directly opposite to the entry orifice of the folded gas bag 18.

As is furthermore depicted in FIG. 4 it is possible without difficulty to accommodate an electrical rotary coupling 32 for the wire to the horn of the vehicle in the interior of the distribution chamber 24. This rotary coupling 32 consists of a spiral "clock spring" in a cylindrical housing attached to the floor 24B and a duct means which surrounds the steering wheel shaft 14 like a sleeve, is coupled with the steering wheel hub 16A for the transmission of torque therebetween and from which a connection of the rotary coupling extends.

On operation of the restraining system the gas coming from the compressed gas container 12 flows into the distribution chamber 24 via the pipe 22 passes through the openings 26 and then into the interior of the gas bag 18 which now expands and ruptures the cover 20. It is now possible for the gas to flow through the annular seal gap 30 and rather more owing to the gas current produced by the jet pump effect air from the surroundings will be drawn through the seal gap 30 into the gas flow as shown in FIG. 2 by the arrows. During further progress of the vehicle collision the head and chest of the occupant will plunge into the inflated gas bag 18 as shown in FIG. 3. There will now be a reversal of the direction of flow, since the gas from the compressed gas container 12 is spent and in the interior of the inflated gas bag 18 there is a heavy pressure, which is increased still further by the body of the occupant plunging into it. The seal gap 30 will now function as a choked venting opening for a controlled escape of gas from the gas bag 18. By suitable dimensioning of the seal gap 30 it is possible for the rate of escape to be set over a wide range. Venting openings in the wall of the gas bag 18 may be partly or completely omitted. It is consequently possible to prevent the vehicle occupant being injured by fragments which are entrained by the gas or, in the case of the use of a pyrotechnic gas generator instead of the compressed gas container as a source of gas, being injured by hot gas.

Figure 7:
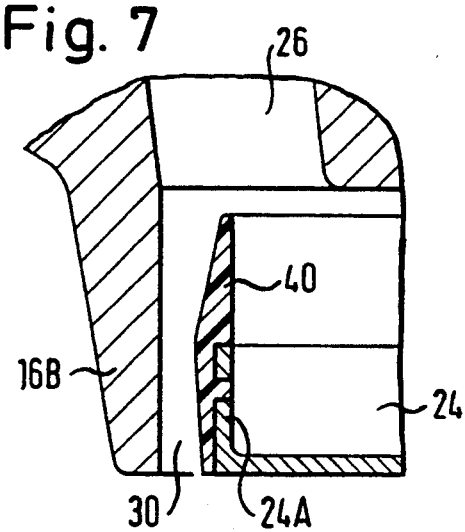
FIG. 7 is a section of pan of a working embodiment with a sealing lip adjoining the sealing gap in the inactive condition.
Figure 8:
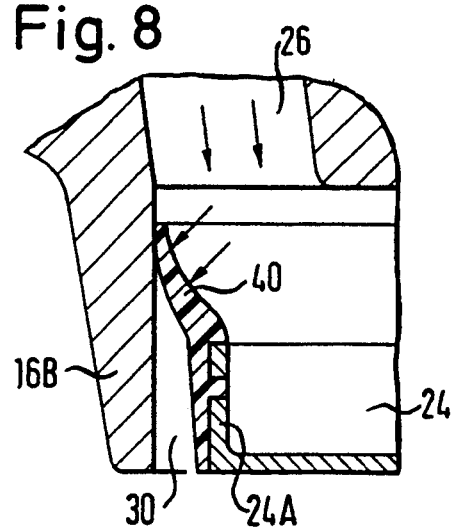
FIG. 8 shows the working embodiment of FIG. 7 after deflection of the sealing lip and with the seal gap closed.

In the case of the working embodiment in accordance with FIGS. 7 and 8 the end, which faces the hub 16A of the steering wheel, of the peripheral wall 24A of the pot-like wall is designed in the form of a flexible sealing lip 40. This flexible sealing lip 40 assumes the setting depicted in FIG. 7 in the inactive state, in which it clears the seal gap 30. On inflation of the gas bag the sealing lip 40 is deflected into the position illustrated in FIG. 8, in which it closes the seal gap 30. In this condition the sealing lip 40 functions as a valve in order to hinder escape of the gas filling through the relatively wide seal gap 30. In the case of the opposite direction of flow the sealing lip 40 clears the seal gap 30 again and hence opens up a discharge route.

Figure 9:
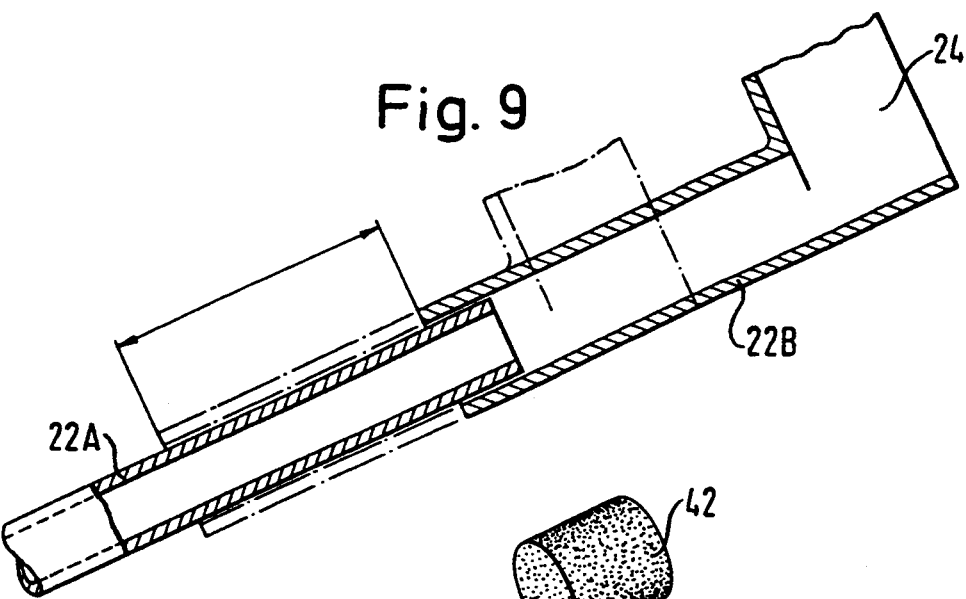
FIG. 9 is a diagrammatic longitudinal section taken through two telescoping tube sections upstream from a distribution chamber.

FIG. 9 shows an working embodiment of the pipe between the distribution chamber 24 and the gas supply (not illustrated) for a steering wheel which can be axially adjusted. The pipe consists of two telescoping tube sections 22A and 22B. This design ensures that the length of the seal gap is not changed on axial adjustment of the steering wheel. Should the steering wheel have to be vertical adjustable as well, then in accordance with a modification of this design the section 22A of the pipe is to be at least flexible in part.

Figure 10:
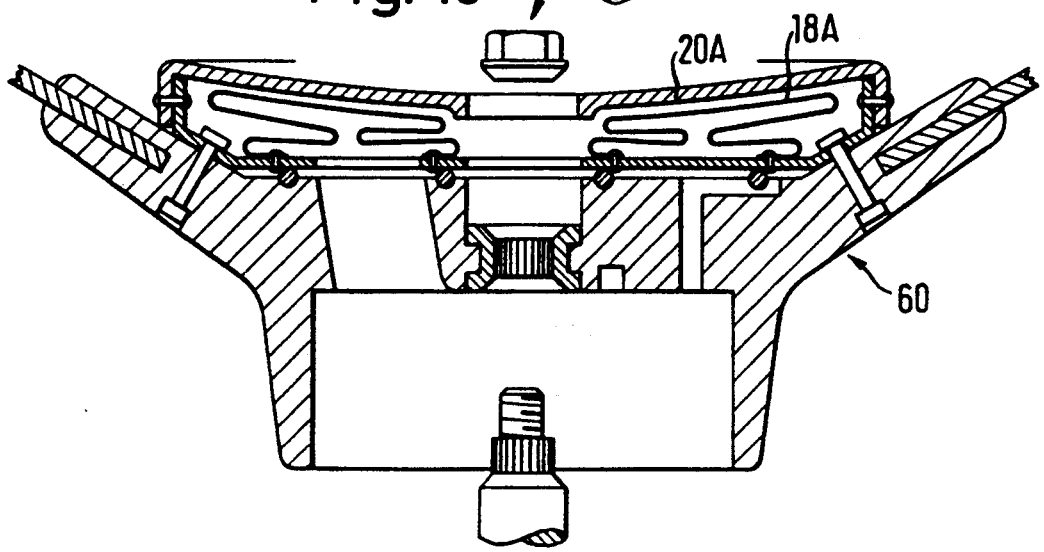
FIG. 10 is a diametral section of part of working embodiment of a steering wheel, which is ready for fitting to the end of the steering shaft as an assembled gas bag restraining system.
Figure 11:
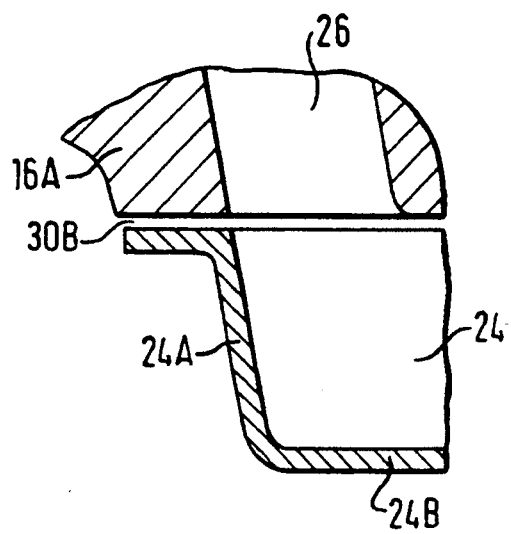
FIG. 11 to FIG. 14 are sections of parts of various possible design of the sealing gap between the steering wheel hub and the distribution chamber.
Figure 12:
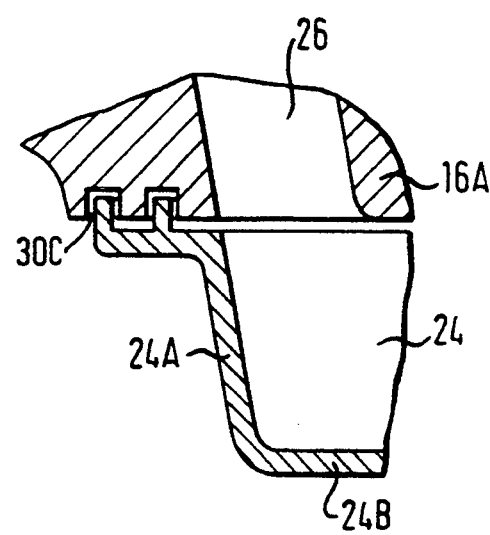

In FIG. 10 the reader will see a steering wheel subassembly equipped with a cover 20A and with the gas bag 18A in the folded condition, which is ready for fitting to the end of a steering shaft. Departing from the working embodiment so far described, the gas bag 18A is designed in the form of a hose so that in the folded condition it leaves a central free space for screwing the nut onto the end of the steering shaft. The cover 20A is provided with a corresponding recess into which after fitting of the steering wheel subassembly a plug 42 can be introduced.

FIGS. 11 through 14 show different possible designs of the seal gap. In the case of the working embodiment in accordance with FIG. 11 the seal gap 30B extends radially in relation to the axis of the steering shaft between two flat gap delimiting surfaces on mutually opposite sides of the steering wheel hub and the wall surrounding the distribution chamber 24. The working embodiment in accordance with FIG. 12 differs from that in accordance with FIG. 11 as regards the labyrinth-like design of the seal gap 30C.

Figure 13:
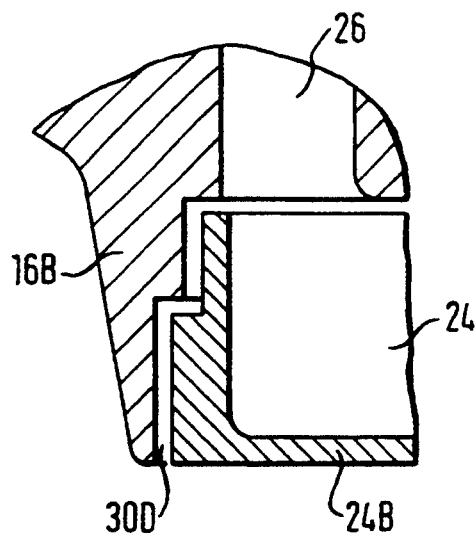

In the case of the working embodiment according to FIG. 13 the seal gap 30D is, unlike the design in accordance with FIG. 4, stepped with the result that the length of the seal gap is increased and the resistance to flow is greater.

Figure 14:
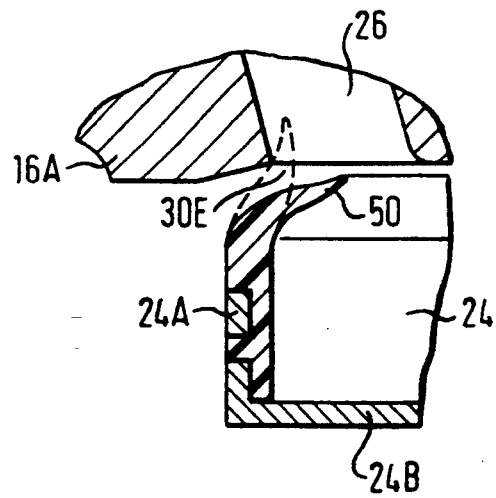

Finally in the case of the working embodiment depicted in FIG. 14 the end, which faces the steering wheel hub 16A, of the peripheral part 24A of the wall delimiting distribution chamber 24, is constituted by a flexible sealing lip 50, which is deflected by the flow of gas on filling of the gas bag and shuts off the seal gap 30E (in the position shown in broken lines). In the case of an opposite direction of flow the sealing lip 50 will be moved in the opposite direction and will clear the seal gap 30E.

What is claimed is:

1. A driver-side gas bag restraining system for vehicles, comprising an inflatable gas bag accommodated in a steering wheel, a source of pressurized gas located outside of the steering wheel adjacent a steering column and tubular duct means extending along said steering column and having a first end connected to said source of pressurized gas, said steering wheel having a hub portion fixed to a steering shaft and wherein at least one passage is formed with a first end facing an inflation opening of the gas bag and a second end communicating with a second end of said duct means without contacting said duct means, a peripheral gap being defined between facing wall portions of the second ends of said duct means and said passage, said tubular duct opening into an annular distribution chamber surrounding said steering shaft and said peripheral gap being defined between a radial flange of said distribution chamber and an opposed radial surface on said hub portion.

2. The gas bag system of claim 1, wherein said tubular duct is composed of at least two telescoping tube sections.

3. A driver-side gas bag restraining system for vehicles, comprising an inflatable gas bag accommodated in a steering wheel, a source of pressurized gas located outside of the steering wheel and duct means having a first end connected to said source of pressurized gas, said steering wheel having a hub portion fixed to a steering shaft and wherein at least one passage is formed with a first end facing an inflation opening of the gas bag and a second end communicating with a second end of said duct means without contacting said duct means, a peripheral gap being defined between facing wall portions of the second ends of said duct means and said passage, said peripheral gap comprising a plurality of alternating mutually perpendicular gap sections forming a labyrinth seal.

4. A driver-side gas bag restraining system for vehicles, comprising an inflatable gas bag accommodated in a steering wheel, a source of pressurized gas located outside of the steering wheel adjacent a steering column and tubular duct means extending along said steering column and having a first end connected to said source of pressurized gas, said steering wheel having a hub portion fixed to a steering shaft and wherein at least one passage is formed with a first end facing an inflation opening of the gas bag and a second end communicating with a second end of said duct means without contacting said duct means, a peripheral gap being defined between facing wall portions of the second ends of said duct means and said passage, said tubular duct opening into an annular distribution chamber surrounding said steering shaft and said peripheral gap being defined between a cylindrical wall defining said distribution chamber and a surrounding cylindrical skirt integrally formed with said hub portion, said cylindrical wall carrying a deflectable seal lip which is deflected outwardly into contact with said cylindrical skirt in response to gas pressure in said distribution chamber.

5. A driver-side gas bag restraining system for vehicles, comprising an inflatable gas bag accommodated in a steering wheel, a source of pressurized gas located outside of the steering wheel adjacent a steering column and tubular duct means extending along said steering column and having a first end connected to said source of pressurized gas, said steering wheel having a hub portion fixed to a steering shaft and wherein at least one passage is formed with a first end facing an inflation opening of the gas bag and a second end communicating with a second end of said duct means without contacting said duct means, a peripheral gap being defined between facing wall portions of the second ends of said duct means and said passage, said tubular duct opening into an annular distribution chamber surrounding said steering shaft, said hub member comprising a plurality of passages extending from said inflation opening in an axial direction of said steering wheel and opening in front of said annular distribution chamber, said passages being defined between radial ribs of the hub portion, and said ribs having surface portions which converge in a direction towards said annular distribution chamber and merge in a common edge.

* * * * *